United States Patent [19]

Inaba et al.

[11] 4,002,723

[45] Jan. 11, 1977

[54] METHOD OF REMOVAL OF NITROGEN OXIDES

[75] Inventors: Hideya Inaba; Shigenori Onizuka; Yasumi Kamino, all of Osaka, Japan

[73] Assignee: Hitachi Shipbuilding & Engineering Co., Ltd., Osaka, Japan

[22] Filed: Feb. 25, 1976

[21] Appl. No.: 661,262

Related U.S. Application Data

[63] Continuation of Ser. No. 471,292, May 20, 1974, abandoned.

[30] Foreign Application Priority Data

Sept. 29, 1973 Japan .......................... 48-109774

[52] U.S. Cl. .............................. 423/239
[51] Int. Cl.$^2$ ........................ B01D 53/34
[58] Field of Search ............ 423/213.2, 213.5, 239, 423/351

[56] References Cited

UNITED STATES PATENTS

| | | | |
|---|---|---|---|
| 2,975,025 | 3/1961 | Cohn et al. | 423/239 |
| 3,449,063 | 6/1969 | Griffing et al. | 423/213.2 |
| 3,791,992 | 2/1974 | Fedwick | 423/213.2 X |
| 3,864,451 | 2/1975 | Lee et al. | 423/239 |

*Primary Examiner*—G. O. Peters
*Attorney, Agent, or Firm*—Farley, Forster and Farley

[57] ABSTRACT

Nitrogen oxides in an exhaust gas are selectively removable by employing ammonia as a reductant and by employing a catalyst composed of alumina, copper, and at least one of the alkali metals, the alkaline earth metals and the transition metals. Optionally, the catalyst composition may include a slight amount (less than 1% by weight) of a precious metal such as rhodium, ruthenium, plantinum and palladium. This selective removal of nitrogen oxides is not impaired by the presence of $O_2$, $H_2O$ and $SO_2$ in the exhaust gas.

7 Claims, 3 Drawing Figures

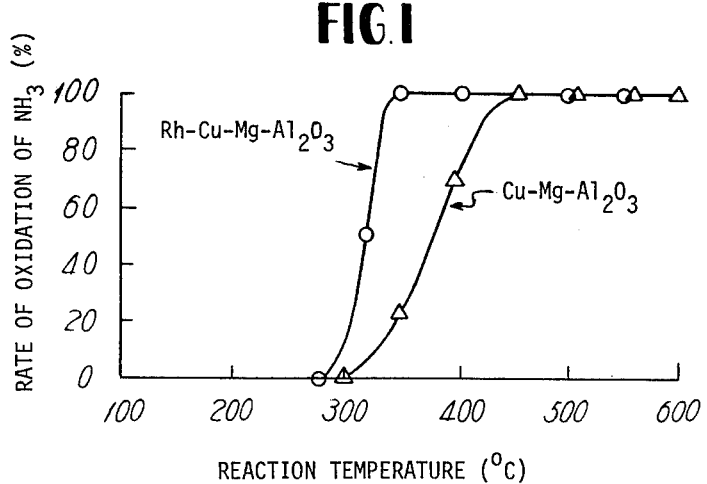
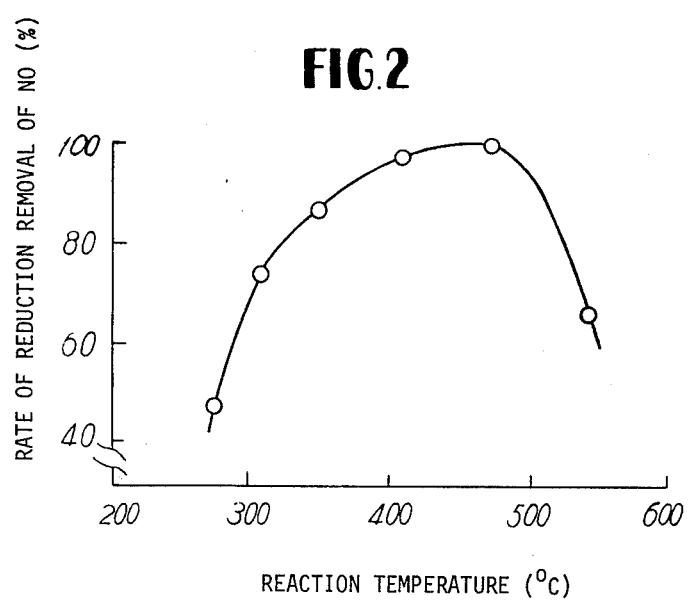
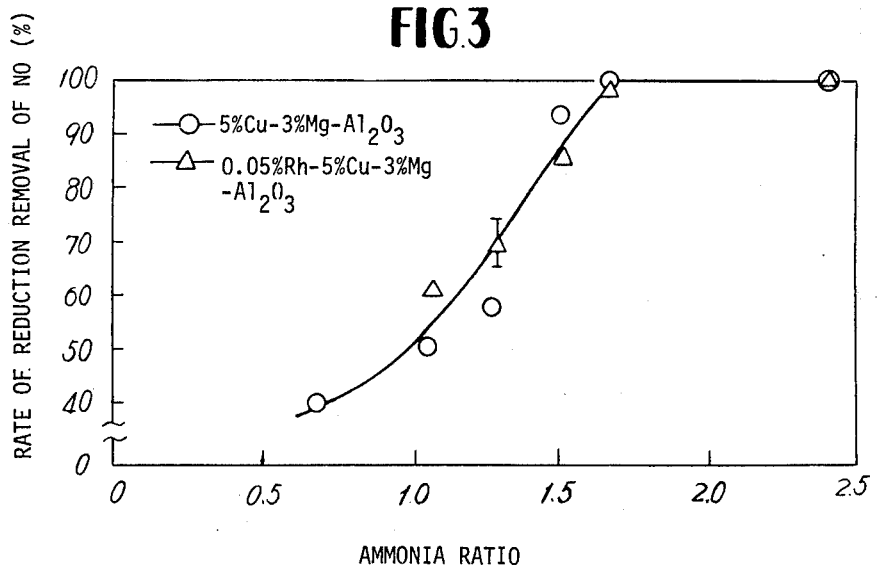

METHOD OF REMOVAL OF NITROGEN OXIDES

This is a continuation of application Ser. No. 471,292, filed May 20, 1974, now abandoned.

The present invention relates to a method of removal of nitrogen oxides.

Nitrogen oxides ($NO_x$) discharged from various combustion apparatuses, chemical plants, cars, etc., have offered a serious problem as they form air pollutants. Therefore, it is strongly desired to take some decisive countermeasure for removal thereof, and researches therefor are being conducted in various places. Basically, countermeasures for removal of $NO_x$ may be divided into two methods, one for suppressing the production of $NO_x$ and the other for making $NO_x$ harmless after it is produced. As for the former method, there are the two-step combustion process, the low-oxygen combustion process, and the exhaust gas circulation process. The latter method includes a process for conversion into nitrogen through a catalytic reaction and a second process for absorption removal by using an absorptive liquid. These processes, however, have their own merits and demerits. There has been established no process which is industrially satisfactory.

As for the forms of nitrogen oxides, $N_2O$, $NO$, $N_2O_3$, $NO_2$, $N_2O_4$, $N_2O_5$ and $NO_3$ are known. However, those that become a problem as air pollutants are $NO$ and $NO_2$ and since the other forms are unstable, they present no problem in practice. Thus, it seems that the term $NO_x$ is used as a generic term for $NO$ and $NO_2$. Further, it is said that the $NO_x$ in exhaust gases discharged from various combustion apparatuses contain 90~95% or more $NO$, the balance being $NO_2$.

The present invention has been accomplished in view of such situation and relates to a method of reducing $NO_x$ contained in exhaust gases to make it harmless. The methods of making $NO_x$ harmless by contact reduction may be roughly divided into two groups. That is, there are a non-selective reduction method in which the oxygen co-existing in exhaust gases is also reduced at the time of the reduction reaction of $NO_x$, and a selective reduction method in which $NO_x$ alone is reduced independently of oxygen. In the former method, carbon monoxide, hydrogen or methane is used as a reducing agent, while in the latter method, ammonia is used as a reducing agent. (W. Bartok, et al., *System Study of Nitrogen Oxide Control Methods for Stationary Sources*, Final Report, Vol. II, Esso Research and Engineering Company Government Research Laboratory, Nov. 20, 1969)

The method proposed herein relates to a selective reduction method using ammonia. The reaction between ammonia and $NO_x$ is expressed by the following formulas.

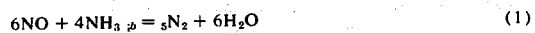
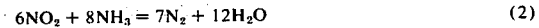

Concerning these reactions, many basic researches have already been made. However, as for the reaction gas type, it sometimes is the reaction between $NH_3$ and $NO$ in $N_2$ flow (G. Chakrabarti, C. Chu, *Atmospheric Environment*, Pergamon Press, 1972, Vol. 6, PP 297~307), but it seems that no research has been conducted which takes into consideration the influence on the catalyst of other components in exhaust gases, that is, $O_2$, $H_2O$, $CO_2$ and $SO_2$. When these gases are passed, there are disadvantages in that there occurs the phenomenon of the catalyst losing its activity and that when it is used for a long period of time there is a problem of deterioration of activity. Further, upon combustion, $NH_3$ produces $NO_x$ in accordance with the following formulas.

These reactions, which are used in connection with the production of nitric acid, are well known, and as catalysts, precious metal type catalysts are used. Further, according to said literature by W. Bartok et al., said reactions take place at temperatures above 400° F. These reactions are not desirable so far as the reduction removal of $NO_x$ is concerned. Generally, the reaction of $NH_3$, of course, stops upon the production of $N_2$.

Although many researches have been conducted on the reaction of $NO_x$ and $NH_3$ as described above, it can hardly be said that there has been completed a catalyst which is practically usable for the reaction gas type which contains $O_2$, $H_2O$, $SO_2$, $CO_2$, etc., as in the actual exhaust gases. No solution has yet been made to auxiliary reactions. Further, in the $NH_3$ reduction method there is the disadvantage that the applicable temperature range is narrow.

We have conducted researches on catalysts for $NH_3$ reduction of $NO_x$ and have successfully developed a catalyst which is truly practically useful and has characteristics which are optimum from the standpoint of reaction. The results will now be fully described with reference to experiment examples, and to the graphs shown in FIGS. 1, 2 and 3 of the accompanying drawing.

EXPERIMENT EXAMPLE 1

"Me" represents one or more elements selected from the group consisting of the alkaline earth metals, alkali metals and transition metals. A material obtained by carrying such Me and Cu on alumina was used as a catalyst. More particularly, referring to a case where Cu and Mg were carried, $\gamma$-alumina (commercially available) was immersed in an aqueous solution of a mixture of nitrates of Cu and Mg, and after filtration and separation, the filtrate was baked in the air at 540° C for 3 hours.

In addition, the catalyst carrier was a ⅜ inch extruded article, but in this experiment example, it was crushed to a 8/14-mesh size before it was used as the catalyst carrier. The reason for such crushing is that the reaction pipe of the experimental equipment was relatively small, as will be later described.

The reaction pipe was a quartz reaction pipe with an inner diameter of 30mm and was installed in an annular furnace in such a manner that it can be set at a predetermined reaction temperature. The experiment of reduction of $NO_x$ ($NO$ being used in the experiment) by $NH_3$ was carried out with said reaction pipe filled with said catalyst and with the reaction gas flowing from above into the reaction pipe. The reaction gas was prepared by mixing predetermined amounts of bottled mixed gases $NH_3+N_2$, $O_2+CO_2+N_2$ and $NO+N_2$ adjusted to predetermined concentrations and then admitted into the reaction pipe. In addition, moisture was added by bubbling the $O_2+CO_2+N_2$ mixed gas through water in an absorption bottle installed in a thermostatic water tank controlled to a predetermined temperature before it is allowed to join the flow of said various mixed gases.

The rate of reduction removal of NO was determined by gas analyzers at the inlet and outlet ports of the reaction pipe, but an $NO_2$ meter produced by Mast Company was used for the analysis of NO. The NO in the sample gas was oxidized into $NO_2$ by an oxidizing device and then admitted into the analyzer. $O_2$ was continuously analyzed by using a magnetic type gas analyzer (produced by Shimazu Siesakusho, Ltd.). $NH_3$ was analyzed by the indophenol method described in the Japanese Industrial Standard (JIS-K-0099, Method for Determination of Ammonia in Exhaust Gas (1969)). $CO_2$ was quantitatively analyzed by a gas chromatograph (produced by Shimazu Seisakusho, Ltd.). In addition, the moisture concentration was determined by calculation.

The conditions and results of the experiment are shown in Table 1.

TABLE 1

Reaction gas composition;

700ppmNO+500ppm$NH_3$+4%$O_2$+12-%$CO_2$+10%$H_2O$+ balance $N_2$

Reaction temperature; 280° C
Space velocity; 2,000hr$^{-1}$ (converted for 20° C)

| Catalyst and composition | Rate of reduction of NO (%) |
|---|---|
| 5%Cu-2%Ba-$Al_2O_3$ | 90 |
| 5%Cu-3%Mg-$Al_2O_3$ | 95 |
| 5%Cu-0.2%K-$Al_2O_3$ | 80 |
| 5%Cu-5%Cr-$Al_2O_3$ | 80 |
| 8%Cu-5%Mn-$Al_2O_3$ | 90 |
| 6%Cu-6%Fe-$Al_2O_3$ | 95 |
| 5%Cu-7%Ni-$Al_2O_3$ | 90 |
| 7%Cu-6%Co-$Al_2O_3$ | 96 |
| 6%Cu-7%Mo-$Al_2O_3$ | 85 |
| 5%Cu-0.2%Pr-$Al_2O_3$ | 86 |

In Table 1, the values expressed in percentage are analyzed values of the individual elements, and for convenience sake, the catalysts produced by the immersion process are expressed in this manner, that is, in terms of Cu—Me—$Al_2O_3$. Ba and Mg are elements representative of the alkaline earth metals among the typical elements and K is an element representative of the alkali metals. All the others are transition elements. Classified a little more finely, Cr, Mn, Fe, Co and Ni are first series main transition elements and Mo is an element representative of the second and third series main transition elements. Further, Pr is an inner transition element. In this way, as for the metals Me other than Cu, Table 1 shows the results concerning representative elements in the respective groups found in the periodic table.

Next, the results concerning catalysts having Me added thereto by the co-precipitation process and the mix-kneading process will be described. A catalyst produced by the immersion process is expressed as, for example, Cu—Mg—$Al_2O_3$, to take an example of the addition of Mg, whereas catalysts prepared by the mix-kneading and co-precipitation processes, for convenience sake, are expressed as Cu—MgO . $Al_2O_3$(mix) and Cu—MgO . $Al_2O_3$(co-). In this case, those which are prepared by the mix-kneading and co-precipitation processes are MgO $Al_2O_3$ carriers, Cu being added by the immersion process. The results of representative examples are shown in Table 2. The experimental conditions are exactly the same as in the Table 1, so that the description thereof is not repeated.

| Catalyst | Rate of reduction of NO (%) |
|---|---|
| Cu-MgO . $Al_2O_3$ (co-)(Cu=5.7%, Mg=22%) | 92 |
| Cu-MgO . $Al_2O_3$ (mix)(Cu=6.0%, Mg=10%) | 85 |
| Cu-$Cr_2O_3$ . $Al_2O_3$ (co-)(Cu=5.2%, Cr=6.0%) | 85 |

As seen in Table 2, for Cu—MgO . $Al_2O_3$(co-), Cu—MgO . $Al_2O_3$(mix) and Cu—$Cr_2O_3$. $Al_2O_3$(co-), in the case of reaction gases under the presence of $O_2$ and $H_2O$, good results are obtained just as in the case of Cu—Me—$Al_2O_3$. For other Me there were observed more or less differences in the rate of reduction of NO, but good results were obtained. Generally, the catalysts produced by the co-precipitation process have higher activity than those produced by the mix-kneading process. Cases where two or more additive metals Me were used were investigated. To take an example, a catalyst having Fe carried on Cu—MgO . $Al_2O_3$(co-) by the immersion process exhibited no changes in the rate of reduction of $NO_x$, nor did it have adverse effects.

X-ray diffraction analysis of the carriers produced by the co-precipitation and mix-kneading processes was carried out. As a result, there were observed obscure signals of eutectics of $\beta$ - alumina, $\gamma$ - alumina or metallic oxide and alumina, or they were almost broad. Thus, in the crystalline structure there were no definite characteristics observed. Similarly, in the case of the catalyst prepared by the immersion process, distinct characteristics were not exhibited.

These experiments were conducted for 10 to 50 hours and the activity of the catalysts were investigated. Reaction temperatures ranging from 100° to 350° C were also investigated. During that time no decrease in the rate of reduction of $NO_x$ due to deterioration of the catalysts was observed. The relation between reaction temperature and the rate of reduction removal of $NO_x$ showed a convex curve with the peak at about 280° C.

This phenomenon will be later described. The decrease of the rate of reduction removal of NO on the lower temperature side is a problem about the rate of reaction of $NH_3$ and NO. On the other hand, the decrease of the rate of reduction removal of NO on the higher temperature side is deemed to be due to the deficiency of reductant caused by $NH_3$.

Cases where two or more elements were carried as Me were described above, but in cases where precious metals were selected as said two or more elements, the activity itself was excellent. Such precious metals as Rh, Ru, Pt and Pd were investigated.

EXPERIMENT EXAMPLE 2

The experimental equipment and method were substantially the same as those described in the experiment example 1. The catalyst used was prepared by spraying the above-mentioned 5% Cu — 3% Mg — $Al_2O_3$ with an aqueous solution of rhodium chloride and then baking the same at 540° C. The composition of the catalyst was 0.05% Rh — 5% Cu — 3% Mg — $Al_2O_3$. The composition of the reaction gas was 700 ppm NO + 500 ppm $NH_3$ + 4%$O_2$ + 12% $CO_2$ + 10% $H_2O$ + the balance $N_2$. The space velocity was 2,500 $hr^{-1}$ (converted for 20° C). The reaction temperature was 290° C. As a result, the rate of reduction removal of NO attained was 92%. As for the addition of precious metals as the third component, investigations were made of Ru, Pt, Pd, etc., besides Rh. In each case, the results obtained were good. Further, experiments were conducted with the Rh concentration varied from the minimum of 0.005% to the maximum of 0.5%, but similar rates of reduction removal of NO were attained.

As described above, it seems that whether the present catalyst contains a precious metal or carries it does not cause any substantial differences so far as the rate of reduction removal of NO is concerned. However, differences were observed in respect of oxidation of $NH_3$. This will be described in the following experiment example 3.

EXPERIMENT EXAMPLE 3

The experimental equipment described in the experiment example 1 was used. The catalysts used were the previously mentioned 5% Cu — 3% Mg — $Al_2O_3$ and 0.05% Rh — 5% Cu — 3% Mg — $Al_2O_3$. The conditions for reaction were as follows. The relation between the rate of oxidation of $NH_3$ and the reaction temperature is shown in FIG. 1.

Reaction gas composition;

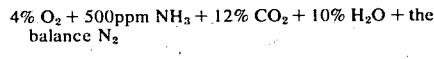

4% $O_2$ + 500ppm $NH_3$ + 12% $CO_2$ + 10% $H_2O$ + the balance $N_2$

Space velocity (SV); $10^4 hr^{-1}$ (converted for 20° C)

As seen in the Figure, the precious metal containing catalyst is lower in the temperature at which the reaction (oxidation) takes place. Further, the gradient of the curve is greater. Therefore, in respect of decreasing the amount of $NH_3$ on the catalyst layer outlet side, the catalyst having a precious metal added thereto is superior. On the other hand, however, the decrease of the rate of reduction removal at higher temperatures is deemed to be great.

As shown, the experiment was conducted with the reaction temperature raised up to 600° C. During that time, the analysis of the $NO_x$ in the gas on the reaction pipe outlet side was carried out, but evolution of $NO_x$ (refer to the reaction formulas (3) and (4)) was not observed. This means that oxidation of $NH_3$ stopped at $N_2$, and this is worth special mention in a method of contact-reducing $NO_x$ by using $NH_3$.

The results described so far relate to a reaction gas system which, though similar to an actual exhaust gas, does not contain $SO_2$. It has been demonstrated that the various catalysts of the present invention are capable of maintaining its activity for reduction of $NO_x$ without being poisoned by $O_2$, $CO_2$ and $H_2O$ in exhaust gases.

Next, the results relating to a reaction gas system containing $SO_2$ will be described in the following experiment example 4.

EXPERIMENT EXAMPLE 4

The experimental method was the same as in Experiment Example 1, but $SO_2$ was continuously admitted into the reaction gas. $SO_2$ was analyzed by the arsenazo III method described in the Japanese Industrial Standard (JIS-K-0103, Methods for Determination of Total Sulfur Oxides and Sulfur Dioxide in Flue Gas (1971) ). Experimental results are shown by taking 5% Cu — 3% Mg — $Al_2O_3$ and 0.03% Rh — 5% Cu — 3% Mg — $Al_2O_3$ as examples.

In addition, the method of producing these catalysts was the same as that described in the preceding experiment example.

The experimental conditions and results concerning 0.03% Rh — 5% Cu — 3% Mg — $Al_2O_3$ are shown in Table 3.

TABLE 3

Reaction gas composition;

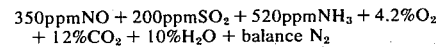

350ppmNO + 200ppm$SO_2$ + 520ppm$NH_3$ + 4.2%$O_2$ + 12%$CO_2$ + 10%$H_2O$ + balance $N_2$ Space velocity; 2500$hr^{-1}$(converted for 20° C)
Catalyst; 0.03%Rh—5%Cu—3%Mg—$Al_2O_3$

| Reaction temperature (° C) | Rate of reduction removal of NO (%) |
|---|---|
| 240 | 83 |
| 260 | >99 |
| 290 | 100 |
| 320 | >99 |
| 340 | 98 |
| 380 | >99 |
| 420 | >99 |
| 460 | 89 |

As described above, the applicable temperature is wide and very effective removal of $NO_x$ is achieved, In a reaction gas system having no $SO_2$, this temperature range was between 250° and 350° C (in this temperature range the rate of removal of $NO_x$ being 85% or above), whereas the co-existence of $SO_2$ gave rather good results.

That is, the activity for reduction of $NO_x$ on the lower temperature side is the same regardless of the presence or absence of $SO_2$, but on the higher temperature side the rate of reduction of $NO_x$ is very high. This means that the present catalyst is not poisoned by $SO_2$. It is believed that the good results obtained on the higher temperature side is due to the presence of $SO_2$ preventing the $NH_3$, which is a reductant, from being oxidized. Further, under the conditions of reaction gas composition and space velocity, with a 5% Cu—3% Mg—$Al_2O_3$ catalyst the rate of reduction removal of $NO_x$ attained at 290° C was 96%, but relatively the activity obtained was slightly lower than when a slight amount of precious metal was added.

The relation between the rate of reduction removal of $NO_x$ and the reaction temperature established under the conditions of very high space velocity using the 5% Cu—3% Mg—$Al_2O_3$ catalyst is shown in FIG. 2. In addition, the conditions for reaction were as follows.

Reaction gas composition;

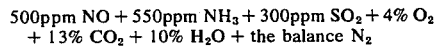

500ppm NO + 550ppm $NH_3$ + 300ppm $SO_2$ + 4% $O_2$ + 13% $CO_2$ + 10% $H_2O$ + the balance $N_2$ Space velocity; 20,000$hr^{-1}$ (converted for 20° C)

As seen in the Figure, in a reaction gas system in which $SO_2$ exists and when the space velocity is very high the curve showing the rate of reduction removal of $NO_x$ forms an acute angle. Further, the reaction temperature at which the highest rate of reduction removal of $NO_x$ is obtained becomes higher.

We have investigated the influences of such sulfides as $H_2S$, COS and $CS_2$ though they do not become a problem in the case of exhaust gases from boilers. The experiments were conducted subsequently to that shown in FIG. 2 and the conditions were exactly the same. However, the reaction temperature was constant, fixed at 420° C. In such investigation, $H_2S$ and COS were added by injecting the same into the reaction gas upstream of the reaction pipe. As for COS, it was added in such a way that part of the reaction gas was allowed to branch from the main and bubble in COS. In each case, its concentration was adjusted to be 4,000ppm. As a result, the respective gases were oxidized into $SO_2$, $H_2O$ and $CO_2$. It was ascertained that the catalyst was not poisoned at all.

In addition, the results shown in Table 3 and FIG. 2 were the average values when the catalyst was maintained at the respective temperatures and for 7 hours for each temperature.

In each of the two experiments, refilling with the catalyst was not effected. Therefore, it follows that the reaction gas was passed through the catalyst layer for at least 40–60 hours, but deterioration of the catalytic performance with the passage of time was not recognized during that time.

In the following experiment 5, the results of a study of a quantitative problem of $NH_3$, which is a reductant, will be described.

EXPERIMENT EXAMPLE 5

In this experiment, the experimental equipment described in the preceding experiment example was used and also the experimental method was substantially the same. The NO, $SO_2$, $O_2$, $CO_2$ and $H_2O$ concentrations in the reaction gas were substantially constant, and by varying the amount of $NH_3$ to be added, variations in the rate of reduction removal of $NO_x$ were determined. Ammonia ratio was defined as an indication of the amount of $NH_3$ to be added. This is expressed by the following formula.

$$NH_3 \text{ ratio} = (NH_3)/(NO)$$

(i); concentration of component i.

That the $NH_3$ ratio is unity means that the NO and $NH_3$ are theoretically equivalent. FIG. 3 shows the results obtained by using as the catalysts the previously mentioned 5% Cu—3% Mg—$Al_2O_3$ and 0.05% Rh—5% Cu—3% Mg—$Al_2O_3$. The experimental conditions are as follows.

Reaction gas compositions;

500ppm NO+300ppm $SO_2$+4%$O_2$+13-%$CO_2$+230~800ppm $NH_3$+10%$H_2O$ + the balance $N_2$ Reaction temperature; 420° C
Space velocity; 20,000hr$^{-1}$ As seen in the Figure, when the reaction temperature and space velocity are high, it seems that there is no difference resulting from different catalysts. The $NH_3$ ratio has an influence on the rate of reduction removal of $NO_x$, it being seen that the higher the $NH_3$ ratio, the better the results. Under these conditions, it seems that it is necessary that the $NH_3$ ratio be greater than 1.5. As described above, however, the rate of reduction removal of $NO_x$ is influenced by the reaction temperature and space velocity. Therefore, a suitable minimum value of $NH_3$ ratio must be determined under particular conditions. For example, under the above-mentioned conditions of reaction gas condition, when the space velocity was 5,000hr$^{-1}$ the rate of reduction removal of $NO_x$ obtained for an $NH_3$ ratio of 1.1 was 98%. Therefore, although the $NH_3$ ratio in using the present catalyst varies with the desired rate of reduction removal of $NO_x$ and other conditions for reaction, it is believed that if the $NH_3$ ratio is above unity, the intended object can be attained.

All the results described in the experiment examples 1 through 5 were obtained in our laboratory. Poisoning by $SO_2$ has been described, but the behavior of $SO_2$ has not been described. According to the results obtained by using a reaction gas system containing $SO_2$, the $SO_2$ passed through the catalyst layer without undergoing any change.

On the other hand, we are now conducting tests with a pilot plant installed in an actual boiler. Thus, such pilot plant test results will be given in the following experiment examples 6 and 7. Also, the behavior of $SO_2$, which was not described previously, will be described therein.

EXPERIMENT EXAMPLE 6

The pilot plant had an exhaust gas treating capacity of 5,500Nm$^3$/hr. Part of an exhaust gas from a heavy-oil boiler (evaporation rate; 40ton/hr) was allowed to branch from the main for the purpose of treatment. In this pilot plant, industrially produced 0.02% Rh — 5% Cu — 3% Mg — $Al_2O_3$ was used. Though still in course of test as described above, measured data obtained 2,000 hours after the start of the test are shown in Table 4. In addition, at the start of the test, the exhaust gas was allowed to flow directly through the catalyst layer to raise the temperature of the latter by the heat the exhaust gas itself had. That is, the catalyst was not subjected to any special treatment before it was put to use.

TABLE 4

Catalyst; ⅜ inch extruded article
Space velocity; 5,000hr$^{-1}$ (converted for 20° C)
Reaction temperature; 420° C

| Gas composition | Catalyst layer inlet exhaust gas | Catalyst layer outlet exhaust gas |
| --- | --- | --- |
| $NO_x$ | 150ppm | 8 ppm |
| $SO_2$ | 280 ppm | 280 ppm |
| $SO_3$ | 10 ppm | 20 ppm |
| $O_2$ | 4% | 4% |
| $CO_2$ | 13% | 13% |
| $NH_3$ | 160 ppm | Less than 5 ppm* |
| $H_2O$ | 12% | 12% |
| $N_2$ | Balance | Balance |

*This analytical value shows the total amount of ammonia and is approximately a limit value of measurement.

Concerning $NO_x$, reduction removal was effected approximately to the fullest extent. As described previously, the results of analysis shown in the table were obtained after the lapse of 2,000 hours, but deterioration of the catalytic activity did not occur at all. As is evident from the table, the features of the present catalyst are as follows:

1. The $SO_2$ in an exhaust does not become a poison to catalyst, nor does it take part in the reaction, passing directly through the catalyst layer.

2. Substantially what has been said of $SO_2$ may also be said of $SO_3$. However, the outlet gas from the catalyst layer has a somewhat higher $SO_3$ content. As yet, no conclusion has been drawn as to whether the cause of this phenomenon is due to oxidation of $SO_2$ or to analytical errors.
3. $O_2$ undergoes no change whatever, which demonstrates that the present catalyst is effective for use as a selective reduction purpose catalyst.
4. The $NH_3$ in the gas on the catalyst layer outlet side is very small in amount, which clearly indicates that the $NH_3$ added in an amount exceeding the theoretical value necessary for reduction removal of $NO_x$ has been substantially oxidized into $N_2$.
5. Therefore, there is no secondary problem arising from $NH_3$ or salts thereof (particularly sulfides).
6. There is observed no poisoning by heavy metals, e.g. V and Ni, dust and the like which are supposed to be contained in an exhaust gas from an actual boiler.

EXPERIMENT EXAMPLE 7

The pilot plant described in the experiment example 6 is equipped with reactors (three systems) capable of treating exhaust gases at the rate of 200Nm³/hr and various catalysts are being tested thereby for catalytic activity. In this experiment example, the results obtained were with 5% Cu — 3% Mg — $Al_2O_3$ which is one of the catalysts being tested. The conditions are the same as those shown in the table 4 described above. In this experiment, about 1,000 hours have elapsed, during which the rate of removal of $NO_x$ is maintained above 98%. This pilot plant is being satisfactorily run.

The experiment examples have been described with particular reference to the Cu—Mg—$Al_2O_3$ or Rh—Cu—Mg—$Al_2O_3$ catalyst, but substantially the same good results can be obtained with other Cu—Me—$Al_2O_3$ and precious metal-Cu—$Me_xO_y$—$Al_2O_3$.

As described above, the present invention provides a method of contact-wise selectively reducing nitrogen oxides from a nitrogen oxide containing gas with ammonia to make the gas harmless, characterized in that a material obtained in such a manner that copper and one or more elements selected from the class consisting of the alkali metals, alkaline earth metals and transition metals are carried on alumina is used as a catalyst. Further, the invention also provides a method of contact-wise selectively reducing nitrogen oxides from a nitrogen oxide containing gas with ammonia to make the gas harmless, characterized in that a material obtained by adding a slight amount of precious metal to a material having alumina carrying thereon copper and one or more elements selected from the class consisting of the alkali metals, alkaline earth metals and transition metals is used as a catalyst.

To sum up, since the catalyst used in the present invention has the following superior characteristics as described above, the method of reduction removal of $NO_x$ using this catalyst can become a process for treating actual gases:

1. The present catalyst is a catalyst for selective reduction of $NO_x$ by $NH_3$.
2. The present catalyst maintains a high and stable activity for a long period of time without being poisoned by ingredients contained in an actual boiler exhaust gas, e.g. $O_2$, $H_2O$, $SO_2$, $SO_3$ or heavy metals.
3. There is no evolution of $NO_x$ due to oxidation of $NH_3$.
4. The operative temperature range is very wide, but if $SO_2$ co-exists in exhaust gases, the activity becomes rather higher than when $SO_2$ does not exist, and the usable temperature range becomes larger.
5. The production of the catalyst is easy, and when the catalyst is actually used there is no need for a special pre-treatment.

We claim:
1. The method of selectively reducing nitrogen oxides from an exhaust gas containing oxygen, moisture and sulphur dioxide by employing ammonia in said exhaust gas as a reductant, the theoretical ratio of the amount of said reductant to the amount of nitrogen oxides being at least equal to 1.0, wherein said exhaust gas and ammonia are contacted at a reaction temperature of 240°–460° C with a catalyst consisting essentially of rhodium, copper, magnesium and alumina.
2. The method set forth in claim 1 wherein the amount of rhodium in said catalyst is about 0.02–0.05% by weight.
3. The method set forth in claim 1 wherein said catalyst contains about 5% copper by weight.
4. The method set forth in claim 1 wherein said catalyst contains about 3% magnesium by weight.
5. The method set forth in claim 1 wherein said catalyst contains about 0.02–0.05% rhodium by weight, about 5% copper by weight and about 3% magnesium by weight.
6. The method set forth in claim 1 wherein said exhaust gas contains in excess of 100 ppm $SO_2$.
7. The method set forth in claim 1 wherein said alumina comprises mainly gamma alumina.

* * * * *